(12) United States Patent
Seki

(10) Patent No.: US 8,316,979 B2
(45) Date of Patent: Nov. 27, 2012

(54) ARRANGEMENT STRUCTURE FOR EVAPORATED FUEL TREATMENT DEVICE OF SADDLE-TYPE VEHICLE, AND VEHICLE INCORPORATING SAME

(75) Inventor: Hiroyuki Seki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 165 days.

(21) Appl. No.: 12/880,338

(22) Filed: Sep. 13, 2010

(65) Prior Publication Data

US 2011/0073399 A1 Mar. 31, 2011

(30) Foreign Application Priority Data

Sep. 30, 2009 (JP) ................................. 2009-225844

(51) Int. Cl.
  *B62D 61/02* (2006.01)
(52) U.S. Cl. ...................................................... 180/219
(58) Field of Classification Search .................. 180/219, 180/216, 218
See application file for complete search history.

(56) References Cited

U.S. PATENT DOCUMENTS

| 8,113,312 | B2* | 2/2012 | Seki et al. ...................... 180/225 |
| 8,118,128 | B2* | 2/2012 | Shimura et al. ............... 180/219 |
| 2010/0065362 | A1* | 3/2010 | Shimura et al. ............... 180/219 |
| 2010/0071985 | A1* | 3/2010 | Harada .......................... 180/219 |
| 2010/0078241 | A1* | 4/2010 | Maeda et al. ................. 180/68.3 |
| 2010/0243358 | A1* | 9/2010 | Suzuki .......................... 180/219 |
| 2011/0100742 | A1* | 5/2011 | Shibata et al. ................ 180/219 |
| 2011/0192668 | A1* | 8/2011 | Kitta ............................. 180/219 |

FOREIGN PATENT DOCUMENTS

| JP | S60-036567 U | 3/1985 |
| JP | S62-058278 U | 4/1987 |
| JP | 3-29573 Y2 | 6/1991 |

\* cited by examiner

*Primary Examiner* — Tashiana Adams
(74) *Attorney, Agent, or Firm* — Carrier Blackman & Associates, P.C.; William D. Blackman; Joseph P. Carrier

(57) ABSTRACT

An arrangement structure for mounting an evaporated fuel treatment device including a canister for a saddle-type vehicle includes an under cowl arranged at a front lower portion of an engine. The canister is arranged below the engine and inside the under cowl. Such arrangement structure enables mounting of the canister on a vehicle body in a compact manner while protecting the canister from traveling wind during vehicle operation, and also from direct sunlight during a parked state of the vehicle, thereby favorably ensuring charge performance and purge performance of the canister.

14 Claims, 6 Drawing Sheets

ARRANGEMENT STRUCTURE FOR EVAPORATED FUEL TREATMENT DEVICE OF SADDLE-TYPE VEHICLE, AND VEHICLE INCORPORATING SAME

CROSS-REFERENCE TO RELATED APPLICATIONS

The present invention claims priority under 35 USC 119 based on Japanese patent application No. 2009-225844, filed on Sep. 30, 2009. The entire subject matter of this priority document, including specification claims and drawings thereof, is incorporated by reference herein.

BACKGROUND OF THE INVENTION

1. Field of the Invention

The present invention relates to an arrangement structure for an evaporated fuel treatment device which is mounted on a saddle-type vehicle such as a motorcycle, and which is operable to capture and collect a fuel gas evaporated from a fuel tank, and to a vehicle incorporating the same. More particularly, the present invention relates to a an arrangement structure for mounting a canister below an internal combustion engine such that the canister is protected from traveling wind during vehicle operation, and also protected from direct sunlight during a parked state of the vehicle, and to a vehicle incorporating the same.

2. Description of the Background Art

There is a known arrangement structure in which an evaporated fuel treatment device (canister) is mounted on a motorcycle. An example of such arrangement structure is disclosed in the Japanese Patent Document JP-B-3-29573.

In the Japanese Patent Document JP-B-3-29573, the canister is arranged in front of an engine and outwardly of a down tube of a vehicle body frame. Accordingly, during vehicle operation, the canister is cooled by a traveling wind. Such cooling of the canister influences the evaporated fuel purge performance. Also, when the vehicle is stopped, such as in a parked state thereof, the canister may be warmed by direct sunlight or the like. Such warming of the canister influences the evaporated fuel charge performance.

In order overcome such drawbacks of the existing arrangement structure for the canister, there has been a demand for the constitution which favorably ensures the purge performance and the charge performance of the canister during traveling operation of the vehicle and when is stopped. At the same time, it is desirable to mount the canister in a compact manner on a vehicle body of a motorcycle which has a small part arrangement space.

The present invention has been made in order to overcome drawbacks the existing arrangement structure for a canister. Accordingly, it is one of the objects of the present invention to provide the arrangement structure of an evaporated fuel treatment device of a saddle-type vehicle which can favorably ensure the charge performance and the purge performance of a canister and can also mount the canister on a vehicle body in a compact manner.

SUMMARY OF THE INVENTION

In order to achieve the above objects, the present invention according to a first aspect thereof provides an arrangement structure of an evaporated fuel treatment device of a saddle-type vehicle (for example, a motorcycle 1 in the embodiment) having an internal combustion engine (for example, an engine 14 in the embodiment) mounted on a vehicle body frame (for example, a vehicle body frame 5 in the embodiment) and a treatment device including a canister (for example, a canister 41 in the embodiment) operable to collect and capture a fuel gas evaporated in a fuel tank (for example, a fuel tank 22 in the embodiment). The arrangement structure includes an under cowl (for example, an under cowl 26 in the embodiment) provided at a front lower portion of the internal combustion engine, wherein the canister is arranged below the internal combustion engine and inside the under cowl.

Here, the above-mentioned saddle-type vehicle is a concept which includes all kinds of vehicles where a rider rides in a straddling manner on a vehicle body, and is a concept which includes not only a motorcycle (including a bicycle with a prime mover and a scooter-type vehicle) but also a three-wheeled vehicle (including a vehicle having two front wheels and one rear wheel besides a vehicle having one front wheel and two rear wheels) or a four-wheeled vehicle.

The present invention according to a second aspect thereof is characterized in that the vehicle body frame includes a down tube (for example, a down tube 12 in the embodiment) which extends downward from a head pipe (for example, a head pipe 6 in the embodiment), is bent and extends rearward, the canister is arranged such that the longitudinal direction of the canister extends along the longitudinal direction of the vehicle and extends along a rearwardly extending portion (for example, a rearwardly extending portion 12b in the embodiment) constituting a lower side of the down tube, and the canister is arranged in an overlapping manner with the rearwardly extending portion as viewed in a side view.

The present invention according to a third aspect thereof is characterized in that the vehicle body frame includes a pair of left and right rearwardly extending portions of the down tube, an oil pan (for example, an oil pan 15a in the embodiment) of the internal combustion engine and the canister are arranged parallel to each other between the left and right rearwardly extending portions, and at least a portion of the canister overlaps with the rearwardly extending portions and the oil pan as viewed in a side view.

The present invention according to a fourth aspect thereof is characterized in that an exhaust pipe (for example, an exhaust pipe 17 in the embodiment) which extends from a cylinder (for example, a cylinder 16 in the embodiment) of the internal combustion engine is arranged to pass through between the internal combustion engine and the under cowl, and to overlap with the canister as viewed in a side view.

The present invention according to a fifth aspect thereof is characterized in that an exhaust catalyst (for example, an exhaust catalyst 17c in the embodiment) is operatively associated with the exhaust pipe, and the exhaust catalyst is arranged below the internal combustion engine such that the exhaust catalyst overlaps with the canister as viewed in a side view.

The present invention according to a sixth aspect thereof is characterized in that the under cowl includes a front wall (for example, a front wall 31 in the embodiment) which covers a front side of the down tube, and side walls (for example, side walls 32 in the embodiment) which cover sides of the down tube. A lower end of the under cowl is formed along a rearwardly and upwardly inclined face (for example, an inclined plane 26a in the embodiment), and an opening portion (for example, opening portion 33 in the embodiment) which opens downward is formed in the lower end of the under cowl. The canister is positioned above the lower end of the under cowl. A front end portion (for example, a flange portion 49 in the embodiment) of the canister is arranged at a same position as an opening front end portion (for example, an opening front end portion 33*b* in the embodiment) formed in the lower end of the under cowl or in front of the opening front end portion.

The present invention according to a seventh aspect thereof is characterized in that the canister includes a bottomed cylindrical resin-made case portion (for example, a case body 47 in the embodiment) and a lid portion (for example, a lid member 48 in the embodiment), which is made of a resin in a same manner as the case portion, closes an opening (for example, an opening 47*a* in the embodiment) of the case portion and is welded to the case portion.

The case portion of the canister has a tapered outer peripheral portion (for example, an outer peripheral portion 47*c* in the embodiment) which sets an opening side thereof wider than a bottom portion (for example, a bottom portion 47*b* in the embodiment) side thereof. The canister is arranged such that the opening side of the case portion and the lid portion are directed toward a front side of the vehicle, and a lower end edge (for example, a lower end edge 47*d* in the embodiment) of the outer peripheral portion of the case portion extends along the inclination of the lower end of the under cowl as viewed in a side view.

The present invention according to an eighth aspect thereof is characterized in that the arrangement structure includes a canister holder (for example, a case cover 51 in the embodiment) which accommodates and holds the canister. The canister holder is formed of an elastic material. The canister holder is arranged so as to cover the whole outer peripheral portion of the case portion using an outer periphery of the lid portion as a positioning portion for positioning the canister in the longitudinal direction. The canister holder is mounted on an inner side of the down tube in the vehicle width direction using a stay (for example, a holding stay 54 in the embodiment) which extends from the down tube.

ADVANTAGES OF THE PRESENT INVENTION

According to the first aspect of the present invention, when the vehicle travels, a traveling wind scarcely (very minimally) hits the canister and, at the same time, the canister is easily warmed by exhaust heat from the internal combustion engine. Hence, a purging operation of the canister is enhanced.

Also, when the vehicle is parked or the like, the direct sunlight or the like is scarcely (very minimally) radiated to the canister. Hence, the canister is easily cooled whereby the canister can easily perform a charging operation.

Further, by arranging the canister in a dead space formed below the internal combustion engine and inside the under cowl, it is possible to arrange the canister in the vehicle body of the saddle-type vehicle in a compact manner.

According to the second aspect of the present invention, the disturbance which affects the canister can be suppressed by the down tube.

According to the third aspect of the present invention, the disturbance which affects the canister can be suppressed not only by the down tube but also by the oil pan.

According to the fourth aspect of the present invention, the exhaust pipe is arranged close to the canister. Hence, the purging operation of the canister can be enhanced by warming the canister by exhaust heat from the exhaust pipe.

According to the fifth aspect of the present invention, the purging operation can be enhanced by warming the canister by exhaust heat from the exhaust catalyst.

According to the sixth aspect of the present invention, when the traveling wind which hits the front wall of the under cowl and flows downward during the traveling of the vehicle flows rearward along the lower end of the rearwardly and upwardly inclined under cowl, air in the inside of the under cowl is drawn out downward from the opening portion.

Since a suitable gap is formed between the under cowl and the internal combustion engine, the traveling wind which enters the inside the under cowl through the gap is warmed by exhaust heat from the internal combustion engine. At the same time, the traveling wind is drawn out from the opening portion, flows into the inside of the under cowl, and hits the canister. Due to such operation during vehicle operation, it is possible to enhance the purging operation by warming the canister.

Further, when the vehicle is stopped, an ascending air current is generated in the inside the under cowl due to exhaust heat from the internal combustion engine so that it is possible to cool the canister by outside air intruded from the opening portion whereby the canister can perform the charging operation efficiently. Further, by also making it difficult for direct sunlight or the like to be radiated to the canister, the canister can efficiently perform the charging operation.

According to the seventh aspect of the present invention, it is possible to arrange the canister in a more compact manner by making use of the inclination of the outer peripheral portion of the case portion.

According to the eighth aspect of the present invention, the influence of the disturbance exerted on the canister which faces the area below the under cowl can be reduced. At the same time, it is possible to support the canister in a compact manner and elastically by using the canister holder formed of the elastic member.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Figure 1:
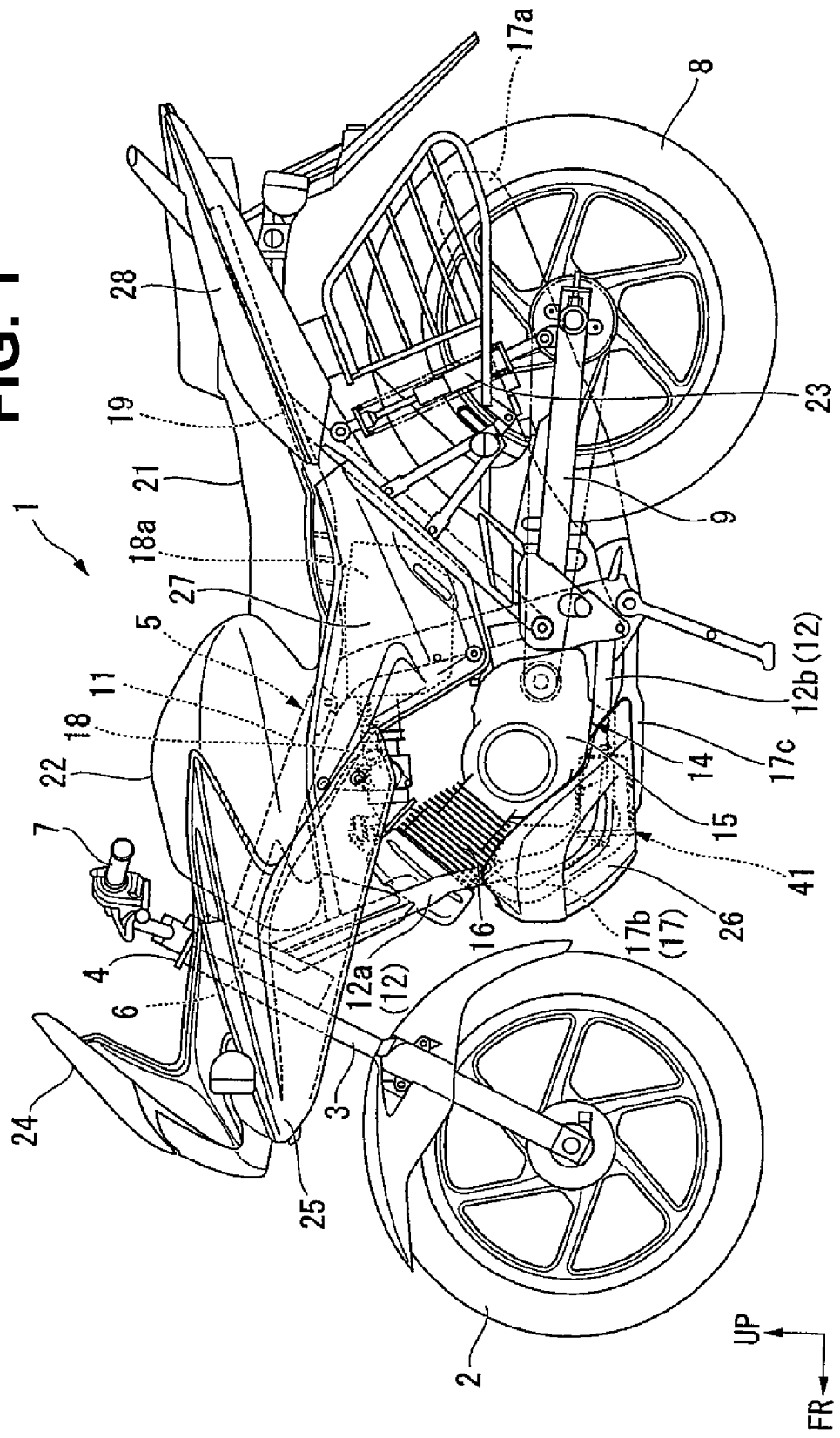
FIG. 1 is a left side view of a motorcycle according to an illustrative embodiment of the present invention.

An illustrative embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

In other words, the directions of "front", "rear", "left", "right" and the like in the explanation made hereinafter are, unless otherwise specified, equal to the directions as viewed with respect to a vehicle. Further, in the drawings, an arrow FR indicates a front side of the vehicle, an arrow LH indicates a left side of the vehicle, and an arrow UP indicates an upper side of the vehicle respectively.

As shown in FIG. 1, a saddle-type vehicle 1 (e.g., motorcycle) includes a front wheel 2 pivotally supported on lower end portions of a pair of left and right front forks 3. Upper portions of the respective front forks 3 are pivotally supported on a head pipe 6 mounted on a front end of a vehicle body frame 5 via a steering stem 4 in a steerable manner. A handle 7 for steering the front wheel is mounted on an upper portion of the steering stem 4. A rear wheel 8 of the motorcycle 1 is pivotally supported on a rear end portion of a swing arm 9.

The vehicle body frame 5 includes a main frame 11 which extends rearward from an upper portion of the head pipe 6, is bent and extends downward, and a pair of left and right down tubes 12 which extend downward from a lower portion of the head pipe 6, are bent and extend rearward. Each of the down tubes 12 includes downwardly extending portions 12 a, 12a on a front portion of the down tube 12, and rearwardly extending portions 12b, 12b on a lower portion of the down tubes 12.

A rear lower portion of the main frame 11 and lower rear portions of the left and right down tubes 12 are merged at a center of a lower portion of a vehicle body. A front end portion of the swing arm 9 is supported on a merged portion in a vertically swingable manner.

An engine 14, which is a prime mover of the motorcycle 1, is mounted on a portion of the motorcycle 1 surrounded by the main frame 11 and the left and right down tubes 12. The engine 14 is an air-cooled single cylinder engine, for example, and has the basic constitution where a frontwardly-inclined cylinder 16 is mounted on a crankcase 15 in an erected manner. An exhaust pipe 17 is connected to a front portion of the cylinder 16, the exhaust pipe 17 is bent so as to pass a front side and a lower side of the crankcase 15, extends rearward, and is connected to a silencer 17a which is arranged on a right side of a vehicle-body rear portion.

A fuel supply device 18, such as a carburetor and a throttle body, is connected to a rear portion of the cylinder 16. An air cleaner box 18a is connected to a rear portion of the fuel supply device 18.

The vehicle body frame 5 includes a seat frame 19 formed at a rear portion of the vehicle body frame 5. The vehicle includes a passenger's saddle-type seat 21 which is supported on the seat frame 19, a fuel tank 22 which is supported on the main frame 11 in front of the seat 21, and a pair of left and right rear cushions 23 which are arranged between the seat frame 19 and the swing arm 9.

Further, the vehicle 1 includes a wind screen 24 which is mounted on an upper side of a front portion of the vehicle body in an erected manner, a front cowl 25 which covers the front portion of the vehicle body, an under cowl 26 which covers a lower portion of the vehicle body, a side cowl 27 which covers side portions of the vehicle body, and a rear cowl 28 which covers a rear portion of the vehicle body.

Figure 2:
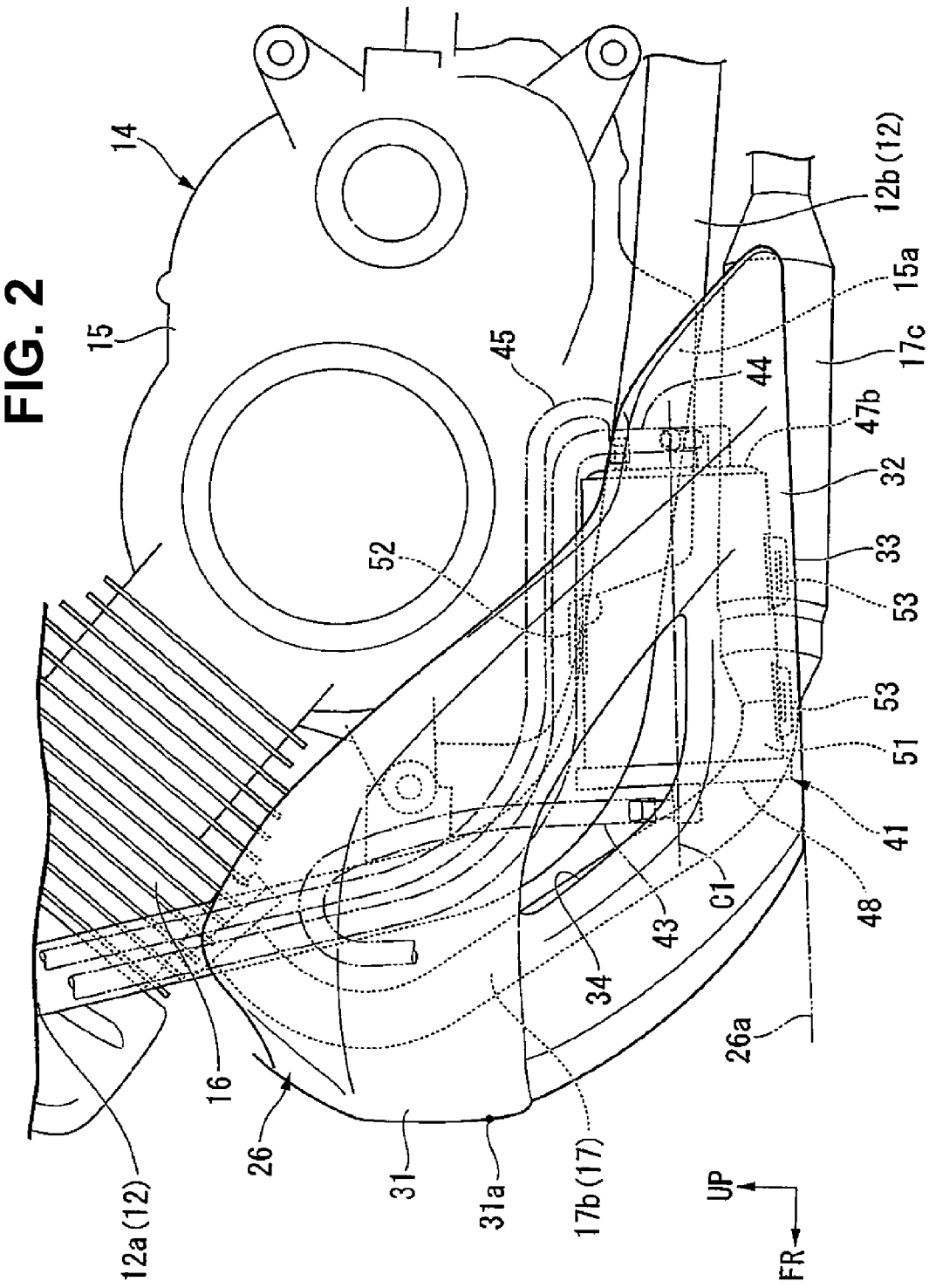
FIG. 2 is a left side view around an engine of the motorcycle.
Figure 3:
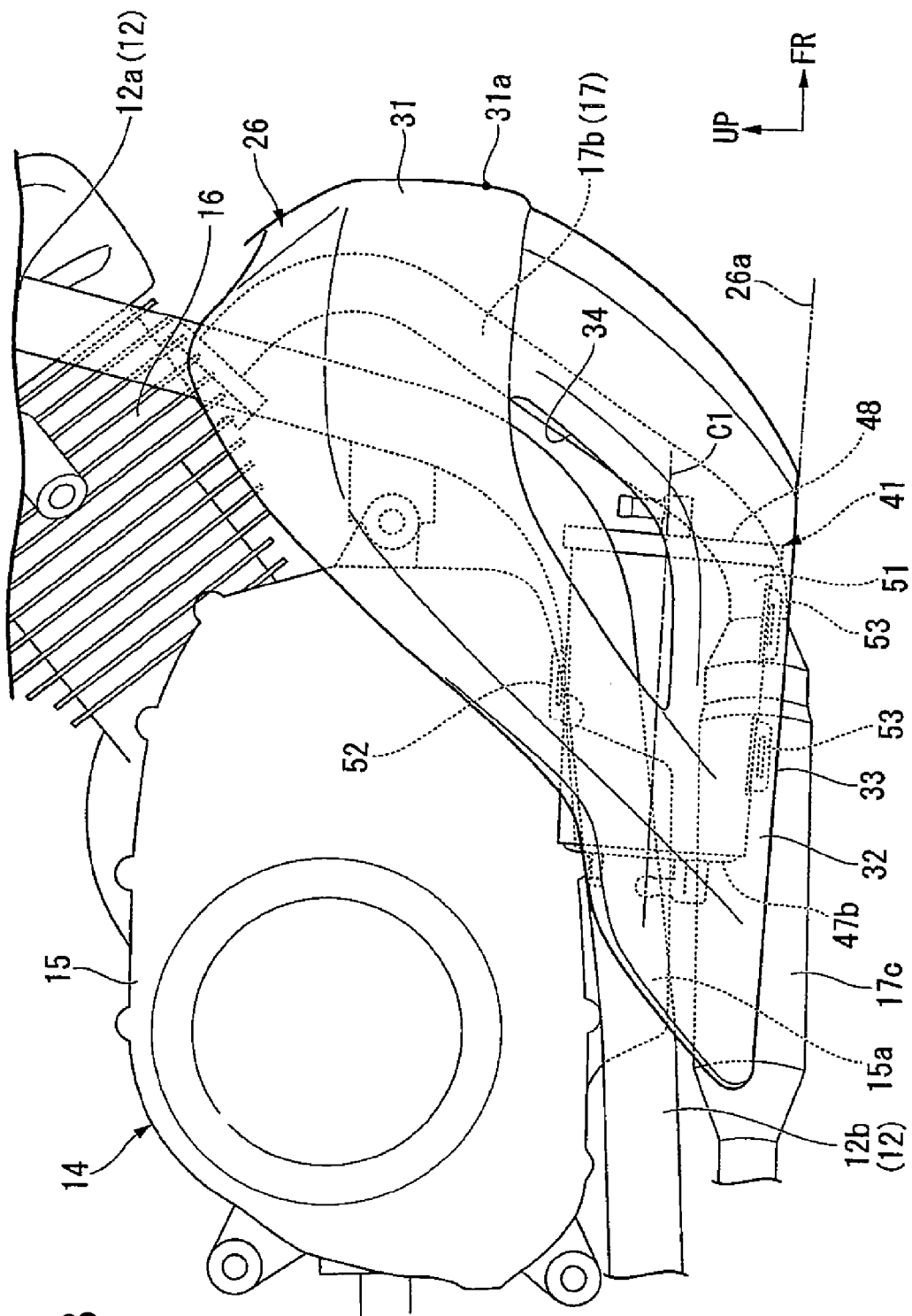
FIG. 3 is a right side view around the engine.
Figure 5:
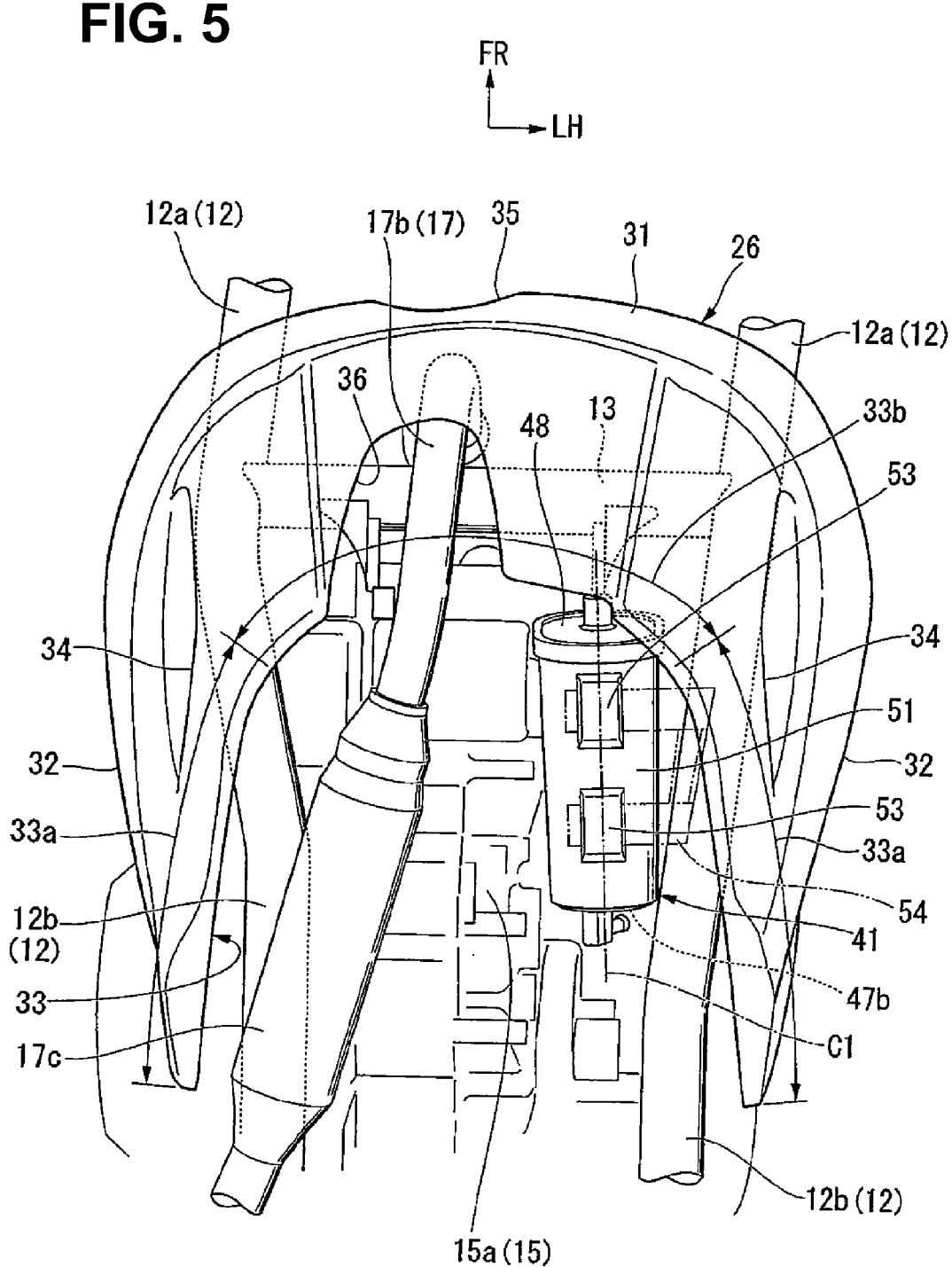
FIG. 5 is a bottom view around the engine.

As shown in FIGS. 2, 3 and 5, the under cowl 26 is positioned behind the front wheel 2 and on a front side of the lower portion of the vehicle body. The under cowl 26 is formed such that the under cowl 26 covers a front side of a lower portion of the engine 14 ranging from a front side to both left and right sides of the engine 14.

The under cowl 26 is an integral body which is constituted of a front wall 31 which covers the front portion of the lower portion of the engine 14, and left and right side walls 32 which extend rearward from both sides of the lower portion of the front wall 31 and cover both left and right sides of the lower portion of the engine 14.

The front wall 31 bulges in a semispherical shape which bulges toward a front side of the vehicle. The front wall 31 includes a bulging peak portion 31a which extends toward a front side of the vehicle slightly above a vertically intermediate portion thereof as viewed in a side view.

The left and right side walls 32 are bent and extend rearward respectively such that the left and right side walls 32 are continuously connected to rear ends of both left and right side portions of the front wall 31. The left and right side walls 32 are arranged in an inclined manner as viewed in a bottom view such that the left and right side walls 32 are positioned inward in a lateral direction (vehicle-width direction) as the left and right side walls 32 extend toward a rear side of the vehicle (so as to narrow a total lateral width of the under cowl 26).

Here, a lower end of the under cowl 26 is positioned below the rearwardly extending portions 12b of the down tubes 12 as viewed in a side view, and is formed along an inclined plane 26a which is approximately horizontal (to be more specific, is slightly inclined in the rearward and upward direction).

An opening portion 33 which opens downward is formed on the lower end of the under cowl 26. The opening portion 33 has an approximately U shape which opens rearward as viewed in a bottom view, and is formed along the lower end (inclined plane 26a) of the under cowl 26. Left and right side edge portions of the opening portion 33 are inclined as viewed in a bottom view such that the left and right side edge portions are positioned laterally more outside as the left and right edge portions extend toward a rear side (so as to widen a total lateral width of the opening portion 33). Accordingly, the left and right side walls 32 are formed such that the left and right side walls 32 are tapered as viewed in a bottom view.

Here, leaf-shaped side openings 34 which extend in the rearward and downward direction as viewed in a side view are formed on both left and right sides of the under cowl 26, such that the openings 34 stride over the front wall 31 and the side walls 32. Through the side openings 34, a part of traveling wind which flows on an outer surface of the under cowl 26 is introduced into the inside of the under cowl 26, passes through the inside of the under cowl 26, and is discharged rearward.

Figure 4:
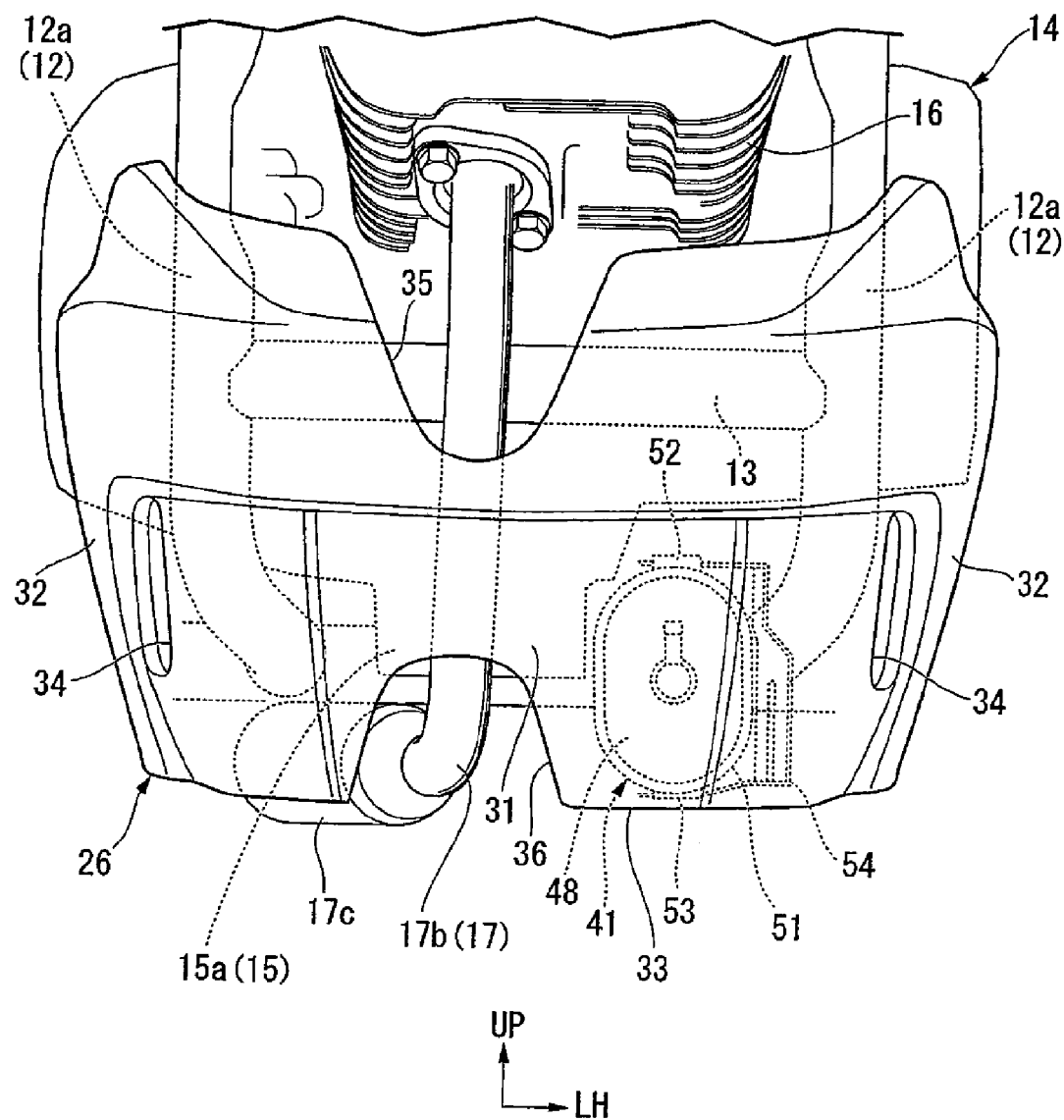
FIG. 4 is a front view around the engine.

As shown in FIG. 4, the exhaust pipe 17 is suitably bent so as to be folded back in the rearward direction in front of the cylinder 16 and the crankcase 15 passes below the crankcase 15, and extends toward the rear side of the vehicle approximately horizontally. The exhaust pipe 17 includes a rear bent portion 17b.

The rear bent portion 17b of the exhaust pipe 17 is arranged to pass through between the cylinder 16 and the under cowl 26 and through between the crankcase 15 and the under cowl 26. Here, upper and lower cutaway portions 35, 36 having an approximately U shape which open upwardly or downwardly are respectively formed on upper and lower portions of a center portion of the front wall 31 in the lateral direction, to avoid the exhaust pipe 17 and to ensure a working space for a fastening member for fastening the exhaust pipe 17 or the like. The vehicle body frame 5 may include a cross member 13 which extends between the downwardly extending portions 12a of the left and right under tubes.

The under cowl 26 is formed into a bulging shape which bulges toward the outside of the vehicle on a front side of the lower portion of the vehicle body and hence, the under cowl 26 is arranged at a sufficient distance away from vehicle-constitutional parts such as the vehicle-body frame 5 (left and right down tubes 12), the engine 14 and the exhaust pipe 17.

A canister (evaporated fuel treatment device) 41 which collects a fuel gas evaporated in the fuel tank 22 is arranged inside the under cowl 26.

The canister 41 absorbs fuel evaporated in the fuel tank 22. Further, the canister 41 supplies the absorbed fuel to an intake passage when the engine 14 is driven so as to burn the fuel in the cylinder 16. In the canister 41, the inside of a case 42 (see FIG. 6) is filled with an evaporated fuel absorbing material made of activated carbon or the like.

A release hose 43, which makes a fuel absorbing portion and the atmosphere communicate with each other, is connected to a front end portion of the case 42, and a fuel supply hose 44 (purge hose) which corresponds to the intake passage and an evaporated fuel introducing hose 45 (charging hose) led from the fuel tank 22 are respectively connected to a rear end portion of the case 42.

The release hose 43 opens in the atmosphere inside the under cowl 26, and the fuel supply hose 44 and the evaporated fuel introducing hose 45 are routed around an upper portion of the vehicle body along the downwardly extending portion 12a of the left down tube 12 and are respectively connected to the intake passage and the fuel tank 22. An electrically-controlled purge control valve (not shown in the drawing), which is arranged inside the front cowl 25, is mounted on a middle of the fuel supply hose 44.

Figure 6:
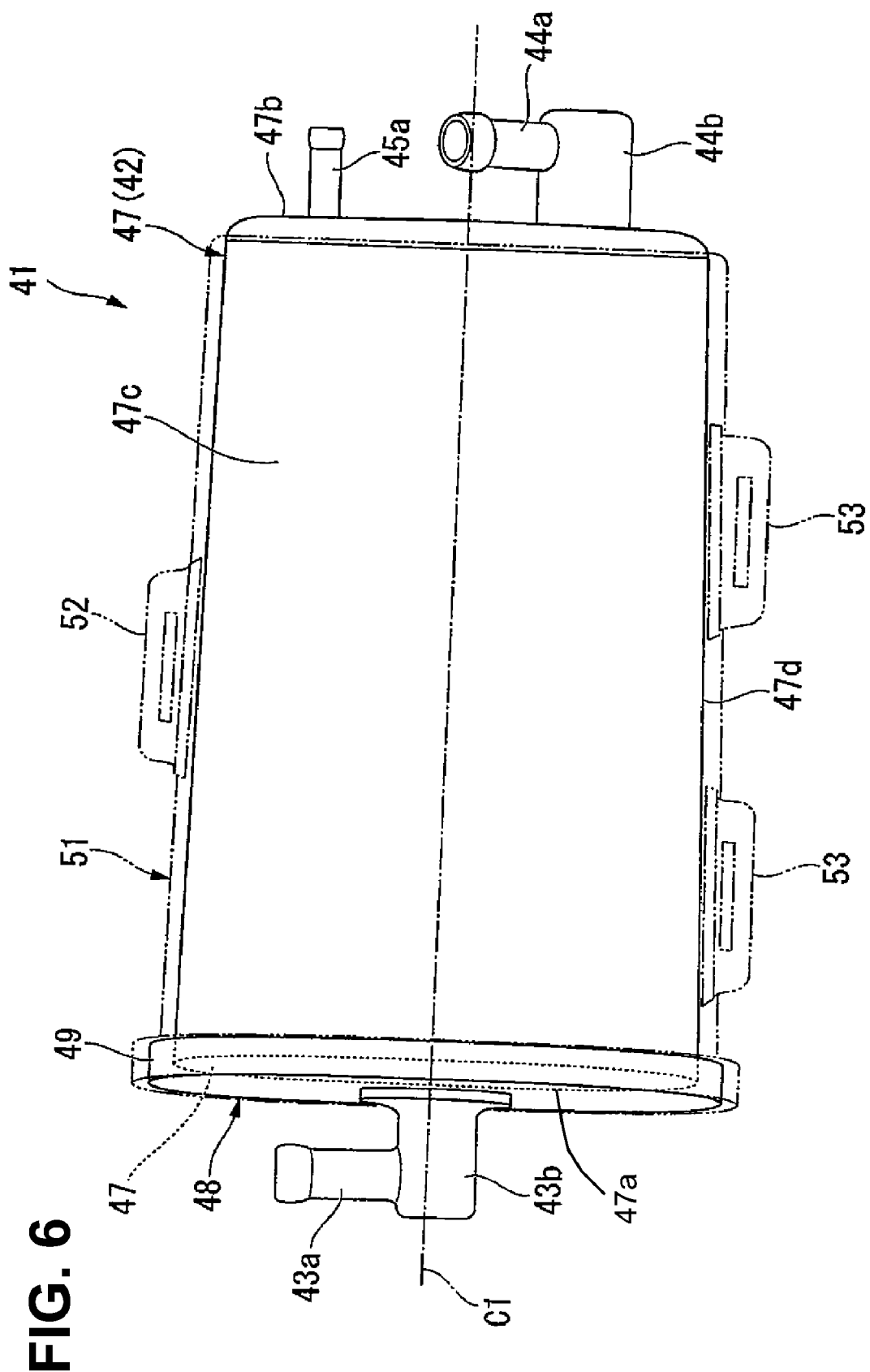
FIG. 6 is a side view of a canister arranged below the engine.

As shown in FIG. 6, the case 42 of the canister 41 includes a bottomed cylindrical case body 47 having an approximately elliptical shape in cross section, and a lid member 48 which is operable to close and open an opening 47a of the case body 47.

The case body 47 is arranged in an approximately horizontal position (to be more specific, in a slightly inclined manner in the rearward and upward direction) such that a center axis (an axis along the longitudinal direction) C1 of the case body 47 extends along a longitudinal direction of the vehicle, and a long-axis direction of the elliptical cross section extends in approximately vertical direction. The case body 47 is arranged such that the opening 47a having a vertically elongated elliptical shape is directed to a front side of the vehicle, and the plate-shaped lid member 48 having a vertically-elongated elliptical shape in the same manner as the opening 47a is mounted in the opening 47a.

The case body 47 and the lid member 48 are each formed of a resin-molded material. The lid member 48 is fixed to the opening 47a of the case body 47 by welding or the like. Hence, the opening 47a of the case body 47 is closed by the lid member 48. On an outer periphery of a front end of the case 42, a stepped flange portion 49 is formed by bulging an outer peripheral portion of the lid member 48.

A front hose connecting nozzle 43a, which extends upward from a frontwardly projecting portion 43b to allow the connection thereof with the release hose 43, is mounted on the approximately center of a front end portion (lid member 48) of the case 42. A rear-lower hose connecting nozzle 44a, which extends upward from a rearwardly projecting portion 44b and allows the connection thereof with the fuel supply hose 44, is mounted on a lower portion of a rear end portion (bottom portion 47b) of the case 42. A rear-upper hose connecting nozzle 45a, which extends rearward from the rear end portion and allows the connection thereof with the evaporated fuel introducing hose 45, is formed on an upper portion of the rear end portion of the case 42.

An outer peripheral portion 47c of the case 42 is covered with a case cover 51 which is formed of an elastic member such as rubber. The case cover 51 has a cylindrical shape along the axis C1 of the case 42, and holds the whole outer peripheral portion 47c of the case 42 with a predetermined fastening margin while allowing the insertion of the case 42 therein. Positioning of the case cover 51 with respect to the case 42 in the longitudinal direction is performed by engaging a front end portion of the case cover 51 with the flange portion 49 of the case 42 from an outer peripheral side. A pair of front and rear upper engaging portions 52 is formed on an upper end portion of the case cover 51, for example, and also a single lower engaging portion 53 is formed on a lower end portion of the case cover 51, for example.

The canister 41 is positioned below the crankcase 15 of the engine 14 and on a right side of a front portion of the rearwardly extending portion 12b of the left down tube 12. More specifically, the canister 41 is arranged on a left side of a front portion of an oil pan 15, which projects toward an area below the crankcase 15 while narrowing a lateral width.

Further, the canister 41 is arranged with the axis C1 thereof extended approximately in a longitudinal direction of the vehicle so that the canister 41 is arranged substantially along the rearwardly extending portion 12b such that the canister is sandwiched between the oil pan 15a and the rearwardly extending portion 12b of the left down tube 12. The oil pan 15a and the canister 41 are arranged parallel to each other in the lateral direction between the left and right rearwardly extending portions 12b.

By arranging the canister 41 adjacent to an inner side of the rearwardly extending portion 12b of the left down tube 12 in the vehicle width direction, the canister 41 scarcely (very minimally) receives disturbances from the outside in the vehicle width direction.

A holding stay 54 having engaging pawls, which engage with the respective engaging portions 52, 53 of the case cover 51, is fixedly mounted on the rearwardly extending portion 12b of the left down tube 12. The holding stay 54 is formed of a steel plate having elasticity. The canister 41 is elastically held by the left down tube 12 (vehicle body frame 5) via the holding stay 54 and the case cover 51.

The outer peripheral portion 47c of the case body 47 facilitates the removal of the case body 47 from a mold. The outer peripheral portion 47c formed into a tapered shape such that an elliptical cross-sectional shape of the outer peripheral portion 47c is gradually enlarged as the outer peripheral portion 47c extends from a bottom portion 47b side to the opening 47a side of the canister 41. A lower end edge 47d of the outer peripheral portion 47c of the case body 47 is arranged along a lower end of the under cowl 26 (the slightly rearwardly and upwardly inclined plane 26a) as viewed in a side view.

The canister 41, including the case cover 51, is arranged above the lower end portion of the under cowl 26 so that there is no possibility that the canister 41 projects downward from the opening portion 33 of the under cowl 26. Further, an upper portion of the canister 41 is arranged in an overlapping manner with the rearwardly extending portions 12b of the down tubes 12 as viewed in a side view. Also, an upper side of the rear portion of the canister 41 is arranged in an overlapping manner not only with the rearwardly extending portions 12b but also with a front portion of the oil pan 15a as viewed in a side view.

On the other hand, although a lower portion of the canister 41 is arranged in a downwardly projecting manner from the rearwardly extending portions 12b, the under cowl 26 extends to an area below the rearwardly extending portions 12b. Hence, there is no possibility that the lower portion of the canister 41 projects downward from the opening portion 33 of the under cowl 26.

An exhaust catalyst 17c, which is mounted on a middle portion of the exhaust pipe 17, is arranged below a right side portion of the engine 14 (crankcase 15). The exhaust catalyst 17c is formed into a cylindrical shape which is coaxial with the exhaust pipe 17. A diameter of the exhaust catalyst 17c is slightly larger than a diameter of the exhaust pipe 17. The exhaust catalyst 17c is arranged along the exhaust pipe 17 approximately horizontally.

The exhaust catalyst 17c (exhaust pipe 17 arranged below the crankcase 15) is inclined as viewed in a bottom view such a portion of the catalyst 17c is mostly positioned outwards the vehicle width direction as the portion of the catalyst 17c extends rearward, and a rear portion of the catalyst 17c is arranged in an overlapping manner with the rearwardly extending portion 12b of the left down tube as viewed in a bottom view.

The exhaust catalyst 17c is positioned below the rearwardly extending portions 12b of the down tubes 12 and the oil pan 15a, and a lower portion of the exhaust catalyst 17c is arranged in a downwardly projecting manner from the opening portion 33 of the under cowl 26. An upper side of a front portion of the exhaust catalyst 17c is arranged in an overlapping manner with a lower side of a rear portion of the canister 41 as viewed in a side view. Here, right in front of the exhaust catalyst 17c, a lower side of a front portion of the canister 41 and the rear bent portion 17b of the exhaust pipe 17 are arranged in an overlapping manner with each other as viewed in a side view.

The canister 41 is arranged such that the flange portion 49 which projects mostly toward an outer peripheral side of the canister 41 partially overlaps with a front end portion (opening front end portion) 33b of the opening portion 33 (such that the flange portion 49 is arranged at the approximately same position as the opening front end portion 33b) as viewed in a bottom view.

Due to such configuration of the arrangement structure of the canister 41, even during vehicle operation, a traveling wind which hits the front wall 31 of the under cowl 26 flows downward along an outer surface of the front wall 31. Accordingly, there is no possibility that the traveling wind hits the front end portion (lid member 48) of the canister 41. The front wall 31 of the under cowl 26 causes resistance to traveling wind such that the traveling wind does not hit the lid member 48 of the canister 41. The front end portion of the canister 41 may be arranged in front of the opening front end portion 33b (in the inside of the under cowl 26).

Further, during vehicle operation, traveling wind flows along the lower end of the under cowl 26. Hence, air in the under cowl 26 is drawn out downward from the opening portion 33. Due to such drawing out of air from the under cowl 26, air which is warmed by heat from the engine 14 and the exhaust pipe 17 hits the canister 41 and the exhaust catalyst 17c thus warming the canister 41 and the exhaust catalyst 17c. Therefore, the purging operation of the canister 41 during traveling of the motorcycle 1 (operation of the engine 14) is enhanced. At the same time, the exhaust catalyst 17c can be easily heated to a predetermined reaction acceleration temperature.

On the other hand, when the vehicle is stopped, e.g., in a parked state thereof, a gap is formed between the upper portion of the under cowl 26 and the vehicle body, and between the under cowl 26 and the engine 14 and the like. Hence, the under cowl 26 opens upward and the lower end of the under cowl 26 opens downward.

With such configuration, the generation of an ascending air current in the under cowl 26 generated by heat from the engine is not interrupted so that the canister 41 can be cooled by outside air which enters from the opening portion 33 thus realizing the efficient charge.

As has been explained hereinbefore, in the arrangement structure of an evaporated fuel treatment device according to the above-mentioned illustrative embodiment which is applied to the motorcycle 1 in which the engine 14 is mounted on the vehicle body frame 5, the under cowl 26 is provided to the front side of the lower portion of the engine 14, and the evaporated fuel treatment device includes the canister 41 which collects a fuel gas evaporated in the fuel tank 22, the canister 41 is arranged below the engine 14 and inside the under cowl 26.

With such configuration, when the motorcycle 1 travels, a traveling wind hardly hits the canister 41. At the same time, the canister 41 is easily warmed by exhaust heat from the engine 14. Hence, a purging operation of the canister 41 can be enhanced.

Further, when the motorcycle 1 is parked or the like, the direct sunlight or the like is hardly radiated to the canister 41. Hence, the canister 41 is easily cooled whereby the canister 41 can easily perform a charging operation.

Furthermore, by arranging the canister 41 in a dead space formed below the engine 14 and inside the under cowl 26, it is possible to arrange the canister 41 in the vehicle body of the motorcycle 1 in a compact manner.

Also, in the above-mentioned arrangement structure of an evaporated fuel treatment device, the vehicle body frame 5 includes the down tube 12 which extends downward from the head pipe 6, is bent and extends rearward, the canister 41 is arranged such that the longitudinal direction of the canister 41 extends along the longitudinal direction of the vehicle and extends along the rearwardly extending portion 12b of the down tube 12, and the canister 41 is arranged in an overlapping manner with the rearwardly extending portion 12b as viewed in a side view.

With such configuration, the disturbance which affects the canister 41 can be suppressed by the down tube 12.

Further, in the arrangement structure of an evaporated fuel treatment device according to the present invention, the vehicle body frame 5 includes the pair of left and right rearwardly extending portions 12b of the down tube 12, the oil pan 15a of the engine 14 and the canister 41 are arranged parallel to each other between the left and right rearwardly extending portions 12b, and at least a portion of the canister 41 overlaps with the rearwardly extending portions 12b and the oil pan 15a as viewed in a side view. Accordingly, the disturbance which affects the canister 41 can be suppressed not only by the down tubes 12 but also by the oil pan 15a.

Further, according to the arrangement structure of an evaporated fuel treatment device of the present invention, the exhaust pipe 17 which extends from the cylinder 16 of the engine 14 is arranged to pass through between the engine 14 and the under cowl 26, and overlaps with the canister 41 as viewed in a side view.

With such configuration, the exhaust pipe 17 is arranged close to the canister 41. Hence, the purging operation can be enhanced by warming the canister 41 by exhaust heat from the exhaust pipe 17.

Further, in arrangement structure of an evaporated fuel treatment device according to the present disclosure, the exhaust catalyst 17c is provided to the exhaust pipe 17, and the exhaust catalyst 17c is arranged below the engine 14 such that the exhaust catalyst 17c overlaps with the canister 41 as viewed in a side view.

With such arrangement, the purging operation can be enhanced by warming the canister 41 also by exhaust heat from the exhaust catalyst 17c.

Further, in arrangement structure of an evaporated fuel treatment device according to the present invention, the under cowl 26 includes the front wall 31 which covers the front side of the down tube 12 and side walls 32 which cover sides of the down tube 12, the lower end of the under cowl 26 is formed along the rearwardly and upwardly inclined surface 26a, the opening portion 33 which opens downward is formed in the lower end of the under cowl 26, and the canister 41 is positioned above the lower end of the under cowl 26, and the front end portion (flange portion 49) of the canister 41 is arranged at the approximately same position as the opening front end portion 33b formed in the lower end of the under cowl 26.

With such configuration during vehicle operation, the traveling wind, which hits the front wall 31 of the under cowl 26, flows downward during the traveling operation of the motorcycle 1, and further flows rearward along the lower end of the rearwardly and upwardly inclined under cowl 26, and air in the inside of the under cowl 26 is drawn out downward from the opening portion 33.

Since a suitable gap is formed between the under cowl 26 and the engine 14, the traveling wind which enters the inside of the under cowl 26 through the gap is warmed by exhaust heat from the engine 14 and, at the same time, the traveling wind is drawn out from the opening portion 33, flows into the inside of the under cowl 26, and hits the canister 41. Due to such an operation, it is possible to enhance the purging operation by warming the canister 41.

Further, when the motorcycle 1 is stopped (e.g., during traveling operation thereof at a stop sign or a signal), an ascending air current is generated inside the under cowl 26 due to exhaust heat from the engine 14 so that it is possible to cool the canister 41 by outside air intruded from the opening portion 33 whereby the canister can perform the charging operation efficiently. Further, by also making it difficult for direct sunlight or the like to be radiated to the canister 41, the canister 41 can efficiently perform the charging operation.

Further, according to the above-mentioned arrangement structure of an evaporated fuel treatment device, the canister 41 includes the bottomed cylindrical resin-made case body 47 and the lid member 48 which is formed of a resin in a same manner as the case body 47, closes the opening 47a of the case body 47 and is welded to the case body 47, and the case body 47 has the tapered outer peripheral portion 47c which sets the opening 47a side thereof wider than the bottom portion 47b side thereof, and the canister 41 is arranged such that the opening 47a side of the case body 47 and the lid member 48 are directed toward the front side of the vehicle, and the lower end edge 47d of the outer peripheral portion 47c of the case body 47 extends along the inclination of the lower end of the under cowl 26 as viewed in a side view.

With such configuration, it is possible to arrange the canister 41 in a more compact manner by making use of the inclination of the outer peripheral portion 47c of the case body 47.

Further, according to the above-mentioned arrangement structure of an evaporated fuel treatment device, the arrangement structure includes the case cover 51 which accommodates and holds the canister 41 and is formed of the elastic member, and the case cover 51 is arranged so as to cover the whole outer peripheral portion 47c of the case body 47 using the outer periphery (flange portion 49) of the lid member 48 as a positioning portion for positioning the canister 41 in the longitudinal direction, and the case cover 51 is mounted on the inner side of the down tube 12 in the vehicle width direction by way of the holding stay 54 which extends from the down tube 12.

With such configuration, the influence of the disturbance exerted on the canister 41 which faces the area below the under cowl 26 can be reduced. At the same time, it is possible to support the canister 41 in a compact manner and elastically using the case cover 51 formed of the elastic material.

Here, the present invention is not limited to the above-mentioned embodiment. For example, it is needless to say that, not to mention that the present invention is applicable not only to a motorcycle but also to a three-wheeled or four-wheeled saddle-type vehicle, various modifications are conceivable without departing from the gist of the present invention.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. An arrangement structure for an evaporated fuel treatment device of a saddle-type vehicle, said vehicle comprising:
    a vehicle body frame;
    an internal combustion engine mounted on the vehicle body frame;
    a fuel tank; and
    a treatment device including a canister which collects and captures a fuel gas evaporated in the fuel tank;
    said arrangement structure comprising an under cowl arranged at a front side of a lower portion of the internal combustion engine;
    wherein:
    the canister is arranged below the internal combustion engine and inside the under cowl,
    said vehicle further comprises a head pipe;
    the vehicle body frame comprises a down tube extending downward from the head pipe, the down tube being bent and extended rearward;
    the canister is arranged such that a longitudinal direction of the canister extends substantially parallel to a longitudinal direction of the vehicle;
    a lower side of the down tube includes a rearwardly extending portion; and
    the canister extends along the rearwardly extending portion of the down tube, and is arranged in an overlapping manner with the rearwardly extending portion as viewed in a side view.

2. The arrangement structure of an evaporated fuel treatment device of a saddle-type vehicle according to claim 1, wherein:
    the down tube comprises a pair of left and right rearwardly extending portions extending therefrom;
    an oil pan of the internal combustion engine and the canister are arranged parallel to each other between the left and right rearwardly extending portions of the down tube; and
    at least a portion of the canister overlaps with the rearwardly extending portions of the down tube and the oil pan as viewed in a side view.

3. The arrangement structure of an evaporated fuel treatment device of a saddle-type vehicle according to claim 1, wherein:
    said vehicle comprises an exhaust pipe extending from a cylinder of the internal combustion engine;
    said exhaust pipe is arranged such that the exhaust pipe passes between and through the internal combustion engine and the under cowl; and
    said exhaust pipe overlaps with the canister as viewed in a side view.

4. The arrangement structure of an evaporated fuel treatment device of a saddle-type vehicle according to claim 2, wherein:
said vehicle comprises an exhaust pipe extending from a cylinder of the internal combustion engine;
said exhaust pipe is arranged such that the exhaust pipe passes between and through the internal combustion engine and the under cowl; and
said exhaust pipe overlaps with the canister as viewed in a side view.

5. The arrangement structure of an evaporated fuel treatment device of a saddle-type vehicle according to claim 3, wherein:
said vehicle comprises an exhaust catalyst provided with the exhaust pipe; and
the exhaust catalyst is arranged below the internal combustion engine such that the exhaust catalyst overlaps with the canister as viewed in a side view.

6. The arrangement structure of an evaporated fuel treatment device of a saddle-type vehicle according to claim 1, wherein:
the under cowl comprises
a front wall which covers a front side portion of the down tube; and
side walls which cover sides of the down tube;
a lower end portion having a rearwardly and upwardly inclined face; and
an opening portion, which opens downward, formed in the lower end portion of the under cowl, said opening portion having an opening front end portion formed therein;
the canister is positioned above the lower end portion of the under cowl; and
a front end portion of the canister is arranged at one of at a same position as the opening front end portion of the under cowl and at a position in front of the opening front end portion.

7. The arrangement structure of an evaporated fuel treatment device of a saddle-type vehicle according to claim 2, wherein:
the under cowl comprises
a front wall which covers a front side portion of the down tube; and
side walls which cover sides of the down tube;
a lower end portion having a rearwardly and upwardly inclined face; and
an opening portion, which opens downward, formed in the lower end portion of the under cowl, said opening portion having an opening front end portion formed therein;
the canister is positioned above the lower end portion of the under cowl; and
a front end portion of the canister is arranged at one of at a same position as the opening front end portion of the under cowl and at a position in front of the opening front end portion.

8. The arrangement structure of an evaporated fuel treatment device of a saddle-type vehicle according to claim 5, wherein:
the under cowl comprises
a front wall which covers a front side portion of the down tube; and
side walls which cover sides of the down tube;
a lower end portion having a rearwardly and upwardly inclined face; and
an opening portion, which opens downward, formed in the lower end portion of the under cowl, said opening portion having an opening front end portion formed therein;
the canister is positioned above the lower end portion of the under cowl; and
a front end portion of the canister is arranged at one of at a same position as the opening front end portion of the under cowl and at a position in front of the opening front end portion.

9. The arrangement structure of an evaporated fuel treatment device of a saddle-type vehicle according to claim 5, wherein:
the canister includes
a bottomed cylindrical resin-made case portion, said case portion having an opening formed therein; the case portion further having a tapered outer peripheral portion which sets an opening side having said opening thereof wider than a bottom portion side thereof; and
a lid portion welded to the case portion, said lid portion being formed of a resin material in a same manner as the case portion, said lid portion being operable to close the opening of the case portion;
the canister is arranged such that the opening side of the case portion and the lid portion are directed toward a front side of the vehicle, and a lower end edge of the outer peripheral portion of the case portion extends along the inclined face of the lower end portion of the under cowl as viewed in a side view.

10. The arrangement structure of an evaporated fuel treatment device of a saddle-type vehicle according to claim 9, wherein
the arrangement structure further comprises a canister holder which accommodates and holds the canister therein; said canister holder being formed of an elastic material;
the canister holder is arranged so as to cover an entire outer peripheral portion of the case portion using an outer periphery of the lid portion as a positioning portion for positioning the canister in the longitudinal direction, and
the canister holder is mounted on an inner side of the down tube in a vehicle width direction using a stay extending from the down tube.

11. A motorcycle comprising:
a vehicle body frame;
an internal combustion engine mounted on the vehicle body frame;
a fuel tank operatively connected with said engine for supplying fuel thereto;
an under cowl arranged at a front lower portion of the internal combustion engine; and
a canister arranged below the internal combustion engine and inside the under cowl, said canister is operable to collect and captures fuel gas vapors evaporated from the fuel tank;
said motorcycle further comprising a head pipe mounted at a front end portion of the vehicle body frame; wherein:
the vehicle body frame comprises a down tube extending in a bent manner downward and rearward from the head pipe;
the canister is arranged such that a longitudinal direction of the canister extends along a longitudinal direction of the vehicle;
a lower side of the down tube includes a rearwardly extending portion; and the canister extends along the rearwardly extending portion of the down tube, and is arranged in an overlapping manner with the rearwardly extending portion as viewed in a side view.

12. A motorcycle according to claim 11, further comprising an exhaust pipe extending from the internal combustion engine;

wherein:

the down tube comprises a pair of left and right rearwardly extending portions extending therefrom;

an oil pan of the internal combustion engine and the canister are arranged parallel to each other between the left and right rearwardly extending portions of the down tube;

at least a portion of the canister overlaps with the rearwardly extending portions of the down tube and the oil pan as viewed in a side view;

said exhaust pipe is arranged such that said exhaust pipe passes between internal combustion engine and the under cowl;

said exhaust pipe overlaps with the canister as viewed in a side view.

13. A saddle-type vehicle comprising:

a vehicle body frame;

a head pipe mounted at a front end portion of the vehicle body frame;

an internal combustion engine mounted on the vehicle body frame;

a fuel tank operatively connected with said engine for supplying fuel thereto;

an under cowl arranged at a front lower portion of the internal combustion engine; and a canister arranged below the internal combustion engine and inside the under cowl such that said canister is protected from cooling thereof by traveling wind during operation of vehicle, and also protected from direct sunlight in a parked state of the vehicle, wherein:

the vehicle body frame includes a down tube extending in a bent manner downward and rearward from the head pipe;

the canister is arranged such that a longitudinal direction of the canister extends along a longitudinal direction of the vehicle;

a lower side of the down tube includes a rearwardly extending portion; and the canister extends along a rearwardly extending portion of the down tube, and is arranged in an overlapping manner with the rearwardly extending portion as viewed in a side view.

14. A saddle-type vehicle according to claim 13, further comprising an exhaust pipe extending from the internal combustion engine;

wherein:

the down tube comprises a pair of left and right rearwardly extending portions extending therefrom;

an oil pan of the internal combustion engine and the canister are arranged parallel to each other between the left and right rearwardly extending portions of the down tube;

at least a portion of the canister overlaps with the rearwardly extending portions of the down tube and the oil pan as viewed in a side view;

said exhaust pipe is arranged such that said exhaust pipe passes between internal combustion engine and the under cowl; and said exhaust pipe overlaps with the canister as viewed in a side view.

\* \* \* \* \*